March 26, 1963 S. WEAVER 3,083,054
BUCKET SEAT ADAPTER
Filed June 6, 1961
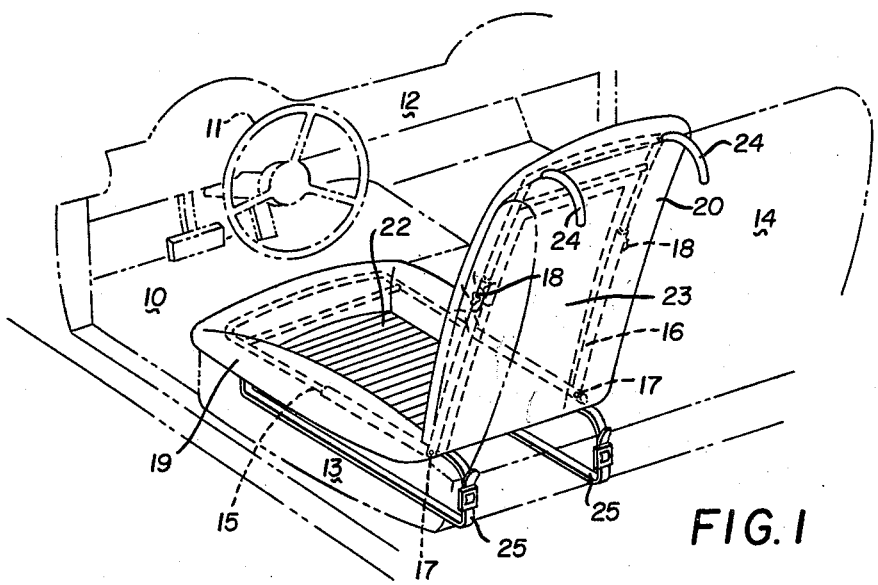
FIG. 1
FIG. 4
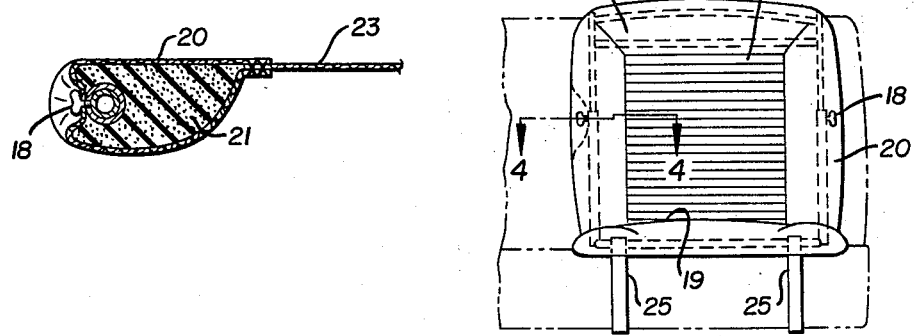
FIG. 2
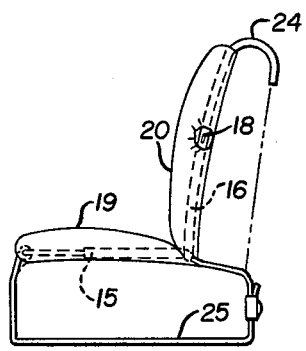
FIG. 3
INVENTOR.
SCOTT WEAVER
BY W. B. Harpman
ATTORNEY 3,083,054
Patented Mar. 26, 1963

3,083,054
BUCKET SEAT ADAPTER
Scott Weaver, Guide Bldg., Canfield, Ohio
Filed June 6, 1961, Ser. No. 115,200
3 Claims. (Cl. 297—219)

This invention relates to automobiles and more particularly to the seats therein and specifically to a device that will alter the conventional bench-type seat so that it closely resembles a bucket seat.

The principal object of the invention is the provision of a bucket seat adapter for an automobile bench-type seat.

A further object of the invention is the provision of a bucket seat adapter that will transform a portion of a bench-type seat so as to provide the characteristics of a bucket seat.

A further object of the invention is the provision of a bucket seat adapter for an automobile bench-type seat that may be easily and quickly installed thereon.

A still further object of the invention is the provision of a bucket seat adapter for an automobile bench-type seat which will provide support at the sides of a person's legs, under the person's knees and at the sides of the person's back when a person is seated thereon.

A still further object of the invention is the provision of a bucket seat adapter for an automobile bench-type seat that may be formed at low cost and sold at relatively low price.

The bucket seat adapter disclosed herein provides an improved seating comfort when applied to automobile bench-type seats such as conventionally used in most automobiles. Such bench-type seats are relatively short in depth of the seat portion and the characteristic shape results in a rolling off toward the front edge of the seat as well as to the sides thereof. A person seated on such a bench-type seat is therefore actually supported only by that portion of the seat directly beneath the person's body. In contrast, a person seated in a bucket seat as used in some automobiles is cradled by the raised sections at the sides of the person's body and across the front edge of the seat and beneath the person's legs. A person seated on a conventional bench-type seat in an automobile rests his back upon a relatively narrow area of the back of the seat immediately in back of his body. On the contrary, in a bucket seat the sides of the back are spaced forwardly of the center section so that a person's body is cradled therebetween. The present invention provides an adapter for a bench-type seat in an automobile by which the advantageous cradling action is provided by supplying appropriately shaped and positioned padded members so that when used in combination with the bench-type seat the adapter provides the comfort and seating characteristics of a bucket seat.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of one of the bucket seat adapters with broken lines indicating a bench-type seat in an automobile and a portion of the automobile.

FIGURE 2 is a front plan view of the bucket seat adapter.

FIGURE 3 is a side view of the bucket seat adapter.

FIGURE 4 is an enlarged horizontal section on line 4—4 of FIGURE 2.

By referring to the drawings and FIGURE 1 in particular, it will be seen that broken lines indicate the front passenger compartment of an automobile, the floor indicated by the numeral 10, the steering wheel 11 positioned thereabove, a portion of the dash panel 12 and a bench-type front seat comprising a seat portion 13 and a back portion 14. A preferred form of the bucket seat adapter is disclosed in postion on the seat 13 and the back 14 of the bench-type seat and as seen in FIGURES 1, 2 and 3, comprises a U-shaped seat frame 15 and a secondary U-shaped back frame 16. In the preferred form of the invention, the ends of the arms of the U-shaped frames 15 and 16 are pivoted to one another by pivots 17. The U-shaped frames 15 and 16 are preferably telescopic so that they may be extended longitudinally of the arms of the U-shaped members. Means for holding the arms in adjustment is provided and comprises set screws 18 as best seen in the detailed view comprising FIGURE 4.

Each of the U-shaped frames 15 and 16 is provided with a U-shaped section of upholstery padding covered with upholstery material 19 in the case of the seat portion and 20 in the case of the back portion. In FIGURE 4 of the drawings the padding is indicated by the numeral 21 and it is positioned so that it covers the frames 15 and 16. Sections of upholstery material 22 and 23 extend between the arms of the U-shaped sections of padding and are secured to the upholstery material and are supported directly on the seat 13 and back 14 of the automobile bench-type seat.

A pair of hooks 24 are secured to the secondary U-shaped frame 16 so that they may be engaged over the back of the seat 14 and a pair of flexible straps 25, 25 are attached to the U-shaped frame 15 and are adapted to be positioned around the seat 13 so as to mount the bucket seat adapter securely thereon.

Those skilled in the art will observe that the U-shaped frame 15 and the U-shaped padding 19 thereabout and the section of upholstery material 22 interconnecting the same may be positioned on the seat 13 without its pivotal attachment to the secondary U-shaped frame 16 and that the secondary U-shaped frame 16 may be formed without the hooks 24 and positioned on the back 14 of the bench-type seat by duplicates of the straps 25.

It will also occur to those skilled in the art that the telescopic arrangement of the U-shaped frames 15 and 16 may be replaced by simple U-shaped frame members of fixed length whereupon the means for holding the telescopic member in adjustment may be dispensed with in such frames as well as those frames of the preferred form as illustrated and heretofore described. The modified bucket seat adapter functions in the same manner in that it provides support at the sides of the person's body and beneath the person's legs and at the same time it provides support at the sides of a person's back and across the shoulders in exactly the same manner as a bucket seat.

It will thus be seen that a bucket seat adapter has been disclosed which meets the several objects of the invention, and having thus described my invention, which I claim is:

1. A bucket seat adapter for a bench-type automobile seat including a seat portion and a back portion and comprising a pair of U-shaped frame members, one of which is positioned on said seat portion with the base of said U-shape forward so as to overlie the front edge of said seat portion, an elongated covered section of padding on said U-shaped frame, said covered padding having a wide flat bottom configuration and a wide upwardly arched top configuration and extending substantially into the area defined by said U-shaped frame, a section of upholstery material attached to and extending between said covered padding and arranged to tension said covered padding to hold the same in position relative to said U-shaped frame and said seat portion, the other one of said U-shaped frames being positioned substantially vertically against said back portion with the base of said U-shaped frame uppermost and adjacent the top edge of said back portion, an elongated covered section of padding on said last-mentioned U-shaped frame, said covered padding having a wide flat back configuration and a wide forwardly curving front configuration and extending substantially into the area defined by said last mentioned U-shaped frame, a section of upholstery material attached to and extending between said covered padding and arranged to tension said covered padding to hold the same in position relative to said last-mentioned U-shaped frame and said back portion of said automobile seat.

2. The bucket seat adapter set forth in claim 1 and wherein the U-shaped frames are movably attached to one another.

3. The bucket seat adapter set forth in claim 1 and wherein the last mentioned U-shaped frame and covered padding has openings therein, hook members partially engaged telescopically in said frame through said openings and arranged to hook over the top of the back portion of said automobile seat to hold said frame thereon.

References Cited in the file of this patent

UNITED STATES PATENTS

| | | |
|---|---|---|
| 1,673,433 | Wheeler | June 12, 1928 |
| 1,707,913 | Knight | Apr. 2, 1929 |
| 1,742,806 | Chaney | Jan. 7, 1930 |
| 1,954,376 | Brueckl | Apr. 10, 1934 |
| 2,027,947 | Wittcoff | Jan. 14, 1936 |
| 2,092,666 | Dietrich | Sept. 7, 1937 |
| 2,260,352 | Trapani | Oct. 28, 1941 |
| 2,587,194 | Mitchell | Feb. 26, 1952 |
| 2,612,938 | Dawkins | Oct. 7, 1952 |
| 2,663,359 | Wood | Dec. 22, 1953 |
| 2,833,341 | Bornstein | May 6, 1958 |
| 2,942,651 | Binding | June 28, 1960 |

FOREIGN PATENTS

| | | |
|---|---|---|
| 596,787 | France | Aug. 17, 1925 |
| 481,613 | Great Britain | Mar. 15, 1938 |
| 737,050 | Germany | July 5, 1943 |
| 1,080,422 | Germany | Apr. 21, 1960 |
| 1,092,322 | Germany | Nov. 3, 1960 |